T. J. MARTIN.
AUTO HOOD ANTIRATTLING DEVICE.
APPLICATION FILED FEB. 17, 1920.

1,375,257.

Patented Apr. 19, 1921.

Inventor
T. J. Martin.

By D. Swift
his
Attorneys

UNITED STATES PATENT OFFICE.

TRUMAN J. MARTIN, OF ALLENTOWN, PENNSYLVANIA.

AUTO-HOOD ANTIRATTLING DEVICE.

1,375,257.  Specification of Letters Patent.  Patented Apr. 19, 1921.

Application filed February 17, 1920. Serial No. 359,309.

*To all whom it may concern:*

Be it known that I, TRUMAN J. MARTIN, a citizen of the United States, residing at Allentown, in the county of Lehigh, State of Pennsylvania, have invented a new and useful Auto-Hood-Antirattling Device; and I do hereby declare the following to be a full, clear, and exact description of the invention, such as will enable others skilled in the art to which it appertains to make and use the same.

The invention relates to antirattling devices for preventing the rattling of automobile hoods incident to vibration of said hoods while the automobile is in motion or incident to the running of the engine. The great difficulty with the securing devices for hoods at present in use is that said devices do not prevent the vibration of the engine hood, therefore they do not prevent rattling of the hood incident to the vibration of the automobile. Therefore it is the object to provide a securing device for receiving the pivoted sides of an automobile hood and holding them in engagement with contacting points, thereby reducing the engaging surfaces to a minimum.

A further object is to provide a hood holding device comprising a member adapted to be secured to the side rail of the chassis, said member having pivotally mounted therein an upwardly extending T-shaped member having an inclined upper surface over which a wedge shaped member carried by the marginal edge of the hood will cam into place into a recess carried by said upwardly extending arm. The upwardly extending arm being controlled by a coiled spring which holds said arm in engagement with the engine hood. Also to provide the member secured to the side rail with an upwardly extending lug having an outwardly extending convexed member adapted to engage the inner wall of the hood and be held in engagement therewith by the spring actuated upwardly extending arm.

A further object is to provide a spring actuated ball located in the bottom of the side rail carried member, which spring actuated ball when the hood is in closed position engages the under edge of the hood and supports said hood, thereby additionally preventing vibration and rattling of the hood.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
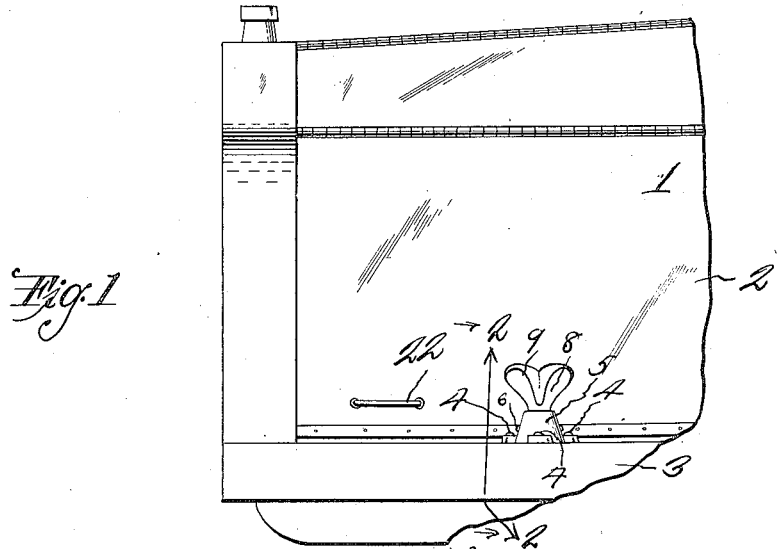
Figure 1 is a view in elevation of a portion of an automobile hood showing the hood holding device applied thereto.
Figure 3:
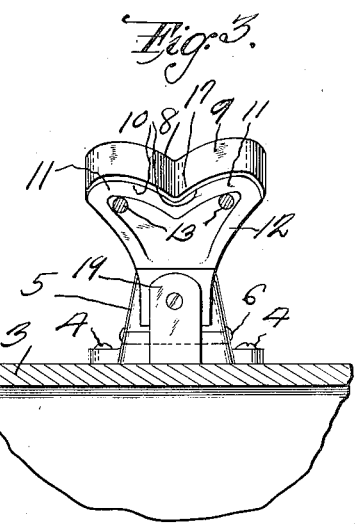
Fig. 3 is a sectional view taken on line 3—3 of Fig. 2.

Referring to the drawings, the numeral 1 designates a conventional form of automobile hood and 2 the lower section thereof. Secured to the side rail 3 of the vehicle frame by means of screws 4 is a housing 5, which housing has pivotally mounted therein on a pin 6 a lever 7. Lever 7 is provided with an upwardly extending arm 8, which terminates in a T-shaped portion 9. One face of the T-shaped portion 9 is provided with a recess 10 for the reception of the lugs 11 of the wedge plate 12 secured by means of screws 13 to the section 2 of the hood. Lever 9 is provided with an upwardly and outwardly extending arm 14 located within the housing 5 and between which arm and across portion 15 of the housing, an expansible coil spring 16 is disposed. Spring 16 normally holds the arm 8 in substantially a vertical position so that when the section 2 of the hood is brought downwardly the wedge plate 12 will engage the inclined surface 17 and cause the arm 8 to be forced outwardly against the action of the spring 16 until the lugs 11 are received in the recess 10 of the T-shaped portion 9. The lower end 2ª of the section 2 of the hood when in closed position rests on a spring actuated ball 18 carried in the base of the housing 5. Spring actuated ball 18 supports the section 2 of the hood in such a manner that it will be prevented from rattling during the vibration of the vehicle.

Rising upwardly from the inner end of the housing 5 is an upstanding lug 19, which lug is provided with a screw held ball 20 which projects inwardly from the inner face of the lug 19 and against which ball the lower end of the hood section 2 is forced by the action of the T end 9 against the outer face of the hood section. T head 9 is provided with an outwardly extending handle 21 adapted to be engaged by the hand of the operator when it is desired to open the hood.

Figure 2:
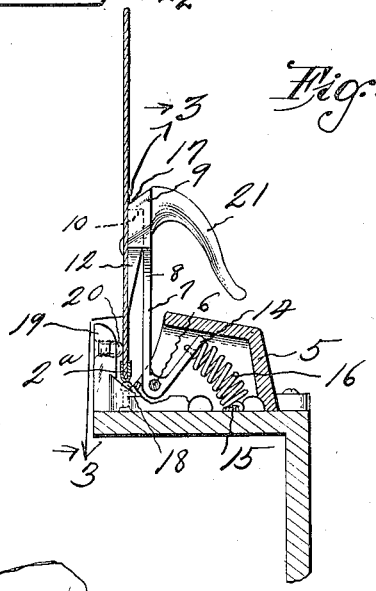
Fig. 2 is a sectional view taken on line 2—2 of Fig. 1, part of the rail carrying member being broken away to show the structure.
Figure 5:
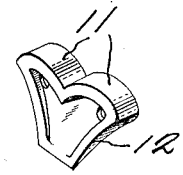
Fig. 5 is a perspective view of the hood carried wedge looking at the same from the rear.
Figure 4:
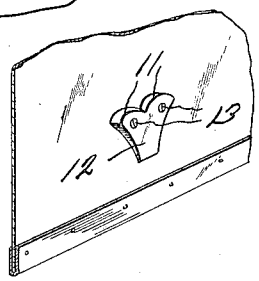
Fig. 4 is a perspective view of a portion of the hood showing the wedge applied thereto.

When it is desired to open the hood the operator grasps the handle 21 and pulls outwardly on the arm 8, which action will cause the release of the wedge member 12, at which time the operator grasps one of the handles 22 and raises upwardly on the section 2. When it is desired to close the hood the section 2 is brought downwardly, wedge 12 cams past the T head 9 and into the position shown in Fig. 2. It is to be understood that any number of clamps or hood holding devices of the character described may be utilized, however for purposes of illustration only one holder is shown.

The invention having been set forth what is claimed as new and useful is:—

A hood holding device for automobile hoods, said device comprising a housing secured to the rail of an automobile frame, an upstanding pivoted arm pivoted in said housing, the upper end of said arm being provided with a recess having its upper wall inclined upwardly and outwardly from substantially a central point and adapted to receive and engage over a similarly shaped lug carried by the hood, an outwardly and upwardly extending integral arm carried by the pivoted arm, a coiled spring interposed between the outwardly and upwardly extending arm and the housing at substantially a right angle to the upwardly and outwardly extending arm for normally holding the upstanding pivoted arm inwardly and an abutment lug carried by the housing against which the inner side of the hood engages and is held when said hood is in closed position.

In testimony whereof I have signed my name to this specification in the presence of two subscribing witnesses.

TRUMAN J. MARTIN.

Witnesses:
H. A. SCHANTZ,
MINNIE H. BECKER.